(12) United States Patent
Takemura

(10) Patent No.: US 10,933,538 B2
(45) Date of Patent: Mar. 2, 2021

(54) END EFFECTOR, HAND DEVICE AND ROBOT EQUIPPED WITH THE SAME

(71) Applicant: HONDA MOTOR CO., LTD., Tokyo (JP)

(72) Inventor: Yoshinari Takemura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 15/910,559

(22) Filed: Mar. 2, 2018

(65) Prior Publication Data

US 2018/0257245 A1 Sep. 13, 2018

(30) Foreign Application Priority Data

Mar. 9, 2017 (JP) .............................. JP2017-044952

(51) Int. Cl.
| | |
|---|---|
| *B25J 15/00* | (2006.01) |
| *B25J 15/08* | (2006.01) |
| *B25J 19/02* | (2006.01) |
| *B25J 19/00* | (2006.01) |
| *B25J 15/02* | (2006.01) |

(52) U.S. Cl.
CPC ........... *B25J 15/08* (2013.01); *B25J 15/0206* (2013.01); *B25J 19/0091* (2013.01); *B25J 19/02* (2013.01); *B25J 19/023* (2013.01); *Y10S 901/01* (2013.01); *Y10S 901/31* (2013.01); *Y10S 901/46* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 4,727,471 A | * | 2/1988 | Driels | B25J 9/1692 348/94 |
| 5,443,354 A | * | 8/1995 | Stone | B25J 5/005 414/729 |
| 5,521,843 A | * | 5/1996 | Hashima | B25J 9/1697 340/815.54 |
| 8,744,215 B2 | * | 6/2014 | Handelman | B25J 9/1697 382/285 |
| 8,936,289 B1 | * | 1/2015 | Kozlowski | B25J 15/08 294/106 |
| 10,682,774 B2 | * | 6/2020 | Bingham | B25J 9/1035 |
| 2006/0111811 A1 | * | 5/2006 | Okamoto | B25J 9/0003 700/214 |

(Continued)

FOREIGN PATENT DOCUMENTS

| | | |
|---|---|---|
| JP | 2010-162638 A | 7/2010 |
| JP | 5515654 | 4/2014 |

(Continued)

OTHER PUBLICATIONS

Japanese Office Action dated Jan. 5, 2021, 6 pages.

*Primary Examiner* — Jonathan L Sample
(74) *Attorney, Agent, or Firm* — Rankin, Hill & Clark LLP

(57) ABSTRACT

A hand section 40 includes a hand base section 40*a* attached to a link section, a first finger section 40*b* provided to extend in a direction non-parallel with a direction toward a tip end portion from a base end portion of the hand base section 40*a*, from the tip end portion of the hand base section 40*a*, and a camera 40*f* provided at a side surface of the hand base section 40*a*, and capable of imaging a sideward of the hand base section 40*a*.

2 Claims, 6 Drawing Sheets

(56) References Cited

U.S. PATENT DOCUMENTS

| | | | | |
|---|---|---|---|---|
| 2010/0298978 A1* | 11/2010 | Tani | ............... | B25J 19/023 700/259 |
| 2011/0071675 A1* | 3/2011 | Wells | ............... | H04N 5/332 700/250 |
| 2011/0106311 A1* | 5/2011 | Nakajima | ............... | B25J 9/163 700/253 |
| 2013/0054025 A1* | 2/2013 | Ito | ............... | B25J 9/1697 700/246 |
| 2013/0103193 A1* | 4/2013 | Roberts | ............... | B25J 15/0491 15/491 |
| 2014/0009583 A1* | 1/2014 | Suzuki | ............... | G01B 11/002 348/46 |
| 2014/0046486 A1* | 2/2014 | Mimura | ............... | B25J 9/1697 700/259 |
| 2014/0365003 A1* | 12/2014 | Takahashi | ............... | B25J 9/0087 700/245 |
| 2015/0012137 A1* | 1/2015 | Mimura | ............... | B25J 13/006 700/264 |
| 2015/0127160 A1* | 5/2015 | Yamaguchi | ............... | B25J 9/1697 700/259 |
| 2015/0261206 A1* | 9/2015 | Shiino | ............... | G05B 19/409 700/257 |
| 2015/0343641 A1* | 12/2015 | Maruyama | ............... | B25J 9/1697 700/259 |
| 2016/0059412 A1* | 3/2016 | Oleynik | ............... | B25J 3/04 700/257 |
| 2016/0059419 A1* | 3/2016 | Suzuki | ............... | B25J 9/1697 700/114 |
| 2016/0203799 A1* | 7/2016 | Sonoda | ............... | B25J 9/1697 700/259 |
| 2016/0229067 A1* | 8/2016 | Nishimura | ............... | B25J 13/085 |
| 2017/0236268 A1* | 8/2017 | Watanabe | ............... | G06T 7/0004 382/152 |
| 2017/0361467 A1* | 12/2017 | Matsuura | ............... | B25J 9/1697 |
| 2018/0161983 A1* | 6/2018 | Yamaguchi | ............... | B25J 19/023 |
| 2018/0161984 A1* | 6/2018 | Ishige | ............... | B25J 19/023 |
| 2018/0178388 A1* | 6/2018 | Ishige | ............... | B25J 19/023 |
| 2019/0176326 A1* | 6/2019 | Bingham | ............... | B25J 9/161 |
| 2019/0176348 A1* | 6/2019 | Bingham | ............... | B25J 15/0213 |

FOREIGN PATENT DOCUMENTS

| | | |
|---|---|---|
| JP | 2016-52695 A | 4/2016 |
| JP | 2016-150411 A | 8/2016 |

* cited by examiner

END EFFECTOR, HAND DEVICE AND ROBOT EQUIPPED WITH THE SAME

BACKGROUND OF THE INVENTION

Field of the Invention

The present invention relates to an end effector such as a hand device that performs motions such as a pushing motion, a pulling motion and a grasping motion, and a robot comprising the end effector.

Description of the Related Art

There has been conventionally known a robot comprising a base body, and robot arms connected to the base body, wherein the robot arms are each composed of a movable link attached to the base body and an end effector (for example, a hand device) attached to the movable link to perform a grasping motion. As this type of robot, there is a robot that recognizes the situation (for example, an object or the like) of a grasping motion performed by the hand device, by a recognition device such as a camera attached to the robot arm (Refer to Japanese Patent No. 5515654, for example.).

In the robot described in Japanese Patent No. 5515654, conventionally, the problem that the movable link to which the hand device is attached or the hand device itself shields the recognition range of the recognition device, is solved by providing the recognition device which has been attached to the movable link of the robot arm, on a front surface of the tip end portion of the hand device (that is, a portion corresponding to a palm of hand when the robot arm is regarded as a human arm portion).

SUMMARY OF THE INVENTION

However, in the conventional robot as described in Japanese Patent No. 5515654, the recognition device is provided at the portion corresponding to the palm of the hand device, so that the recognition range of the recognition device is shielded by the object itself at the stage when a motion (for example, a grasping motion) is completed or the stage immediately before the completion of the motion, and there is the fear that whether or not the motion is performed properly cannot be sufficiently recognized.

The present invention is made in the light of the above problem, and has an object to provide an end effector, a hand device and a robot comprising the same that are capable of property recognizing a situation around of the hand device, such as an object of a motion at a stage when the motion is completed and at a stage just before the motion is completed.

An end effector of the present invention is
an end effector that is attached to a robot arm, and comprises
a base section that is attached to the robot arm,
a motion section that is provided at the base section, and
an end effector side recognition device that is provided in the base section in a posture in which the end effector side recognition device can recognize a state of an environment in a second direction that is non-parallel to a first direction, the first direction being a direction of a load that is applied to an object from the motion section, and is capable of recognizing the second direction.

In this way, the end effector side recognition device of the end effector is provided in the posture in which the end effector side recognition device can recognize the state of the environment in the second direction which is the direction (the direction other than the same direction or the opposite direction) non-parallel to the first direction which is the direction of the load which is applied to the object from the motion section, and is capable of recognizing the direction.

Thereby, when the motion section performs a motion of applying a load to the object, a recognition range of the end effector side recognition device is not shielded by the object, at any stage of the motion.

Consequently, according to the end effector of the present invention, the recognition range of the end effector side recognition device is not shielded by the object even at the stage when a motion is completed and at the stage just before the completion, so that the situation around the end effector can be properly recognized.

Further, in the end effector of the present invention,
the motion section is preferably a motion link member that is attached movably to the base section.

In this way, the end effector of the present invention is not limited to the end effector in which the motion section is constructed to be integrated with the base section, but may be an end effector in which a motion section is constructed as a motion link member which is movably attached to a base section.

Further, in the end effector of the present invention,
the end effector side recognition device is preferably installed in the base section.

When a pushing motion or the like is performed to an object in which depressions and projections are present on the surface, with the end effector, if the end effector side recognition device is provided at a position protruded from the base section, there is the fear that the end effector side recognition device collides with the projected portions of the object and breaks.

If the configuration in which the end effector side recognition device is contained in the base section is adopted, the object can be prevented from colliding with the end effector side recognition device (specifically, a photographing lens or the like of the end effector side recognition device) during a pushing motion or the like.

Further, a robot of the present invention is
a robot comprising a base body, and a plurality of robot arms connected to the base body,
wherein the robot arms comprise a plurality of link sections that are connected in series, end effectors that are attached to the link sections, and joint mechanisms that rotatably connect the link sections to each other,
the end effectors comprise base sections that are attached to the link sections, motion sections that are provided at the base sections, and end effector side recognition devices that are provided in the base sections each in a posture in which the end effector side recognition device can recognize a state of an environment in a second direction that is non-parallel to a first direction, the first direction being a direction of a load that is applied to an object from the motion section, and are each capable of recognizing the second direction, and
the robot being capable of walking by driving at least either one of the robot arms to ground the end effector of the robot arm so that the robot arm becomes a support leg, and driving another robot arm so that the another robot arm becomes a lifted leg.

When walking is performed in such a manner as to ground the above described end effector, the recognition range of the end effector side recognition device is a position close to the ground plane at the time of grounding of the end effector, and the recognizable direction is substantially parallel with the ground plane. Thereby, the situation of the ground plane can be recognized in detail by the end effector side recognition device. As a result, at the time of a walking mode in which the end effector is grounded, the robot can be caused to walk stably based on the information recognized in this way.

Further, a hand device of the present invention is
a hand device that is attached to a robot arm, and comprises
a hand base section that is attached to the robot arm,
a finger section that is provided to extend in a direction that is non-parallel with a direction toward a tip end portion from a base end portion of the hand base section, from the tip end portion of the hand base section, and
a hand side recognition device that is provided on a side surface of the hand base section and is capable of recognizing a sideward of the hand base section.

In this way, in the hand device of the present invention, the finger section is integrally provided to extend from the hand base section, so that a joint mechanism is not provided between the hand base section and the finger section. Consequently, the number of kinds of motions that this device can perform is smaller as compared with the hand device comprising a joint mechanism between the hand base section and the finger section, but strength as the entire hand device can be enhanced.

Thereby, when the hand device performs a motion that does not require complicated movement (for example, a pulling motion that is performed with the finger section locked to an object, or the like) with respect to an object with a large load, the hand device can favorably perform such a motion.

Further, the hand side recognition device of the hand device is provided on the side surface of the hand base section and can recognize a side way of the hand base section (for example, a direction non-parallel with the direction in which the finger section is provided to extend).

Thereby, when the motion of locking the object by the finger section and pulling the object, the motion of pushing the object by the finger section or the like is performed, the recognition range of the hand side recognition device is not shielded by the object at any stage of the motion.

Consequently, according to the hand device of the present invention, the recognition range of the hand side recognition device is not shielded by the object even at the stage when a motion is completed, and at the state just before the completion, so that the situation around the hand device can be properly recognized.

Further, a robot of the present invention is
a robot comprising a base body, a first robot arm and a second robot arm that are connected to the base body,
wherein each of the first robot arm and the second robot arm includes a plurality of link sections that are connected in series, a hand device that is attached to the link sections, and a joint mechanism that rotatably connects the link sections to each other,
the hand device includes a hand base section that is attached to the link section, a finger section that is provided to extend in a direction that is non-parallel with a direction toward a tip end portion from a base end portion of the hand base section, from the tip end portion of the hand base section, and a hand side recognition device that is provided on a side surface of the hand base section, and is capable of recognizing a sideward of the hand base section, and
the hand side recognition device of the first robot arm is provided at a position in which the hand side recognition device can recognize the hand device of the second robot arm when both of the first robot arm and the second robot arm are in a reference state where the link sections do not rotate with each other.

In this way, in the robot of the present invention, as the hand side recognition device, the hand side recognition device which is provided on the side surface of the hand base section, and can recognize the sideward (side way) of the hand base section is adopted. Further, in the robot of the present invention, the hand side recognition device of the first robot arm can recognize the hand device of the second robot arm when both the first robot arm and the second robot arm are in the reference state.

Thereby, in the robot of the present invention, the hand device of the second robot arm which is in the reference state (that is, the state where the robot arm is straightened to a maximum extent, the state in which a bending motion is not performed) can be recognized by the hand side recognition device of the first robot arm which is in the reference state.

Consequently, according to the robot of the present invention, even in the state where the second robot arm is straightened to the maximum extent, a bending motion of the first robot arm does not have to be performed for recognition, and the hand device can be recognized in detail. Further, the bending motion of the first robot arm is not required for recognition, so that a space for the bending motion of the first robot arm at the time of recognition can be saved.

Further, a robot of the present invention is
a robot comprising a base body, a robot arm connected to the base body, and a base body side recognition device provided in the base body,
wherein the robot arm comprises a plurality of link sections connected in series, a hand device that is attached to the link sections, and a joint mechanism that rotatably connects the link sections to each other,
the hand device comprises a hand base section that is attached to the link section, a finger section that is provided to extend in a direction that is non-parallel with a direction toward a tip end portion from a base end portion of the hand base section, from the tip end portion of the hand base section, and a hand side recognition device that is provided on a side surface of the hand base section and is capable of recognizing a sideward of the hand base section,
the base body side recognition device is capable of recognizing the hand device, and
a recognition direction of the hand side recognition device is a direction that is non-parallel with a recognition direction of the base body side recognition device, when the robot arm is in a reference state where the link sections do not rotate with each other.

In this way, the robot of the present invention comprises the base body side recognition device capable of recognizing the hand device, in the base body, besides the hand side recognition devices. Further, the robot of the present invention is configured so that the recognition direction of the hand side recognition device and the recognition direction of the base body side recognition device are the non-parallel directions even in the reference state (that is, the state where the robot arms are straightened to the maximum extent).

Consequently, according to the robot of the present invention, the object can be always continued to be recognized from multiple angles with the hand side recognition devices and the base body side recognition device.

BRIEF DESCRIPTION OF THE DRAWINGS

FIG. 5A is a side view, and FIG. 5B is a perspective view;

FIG. 6A illustrates a closed state, and FIG. 6B illustrates an open state.

DETAILED DESCRIPTION OF THE PREFERRED EMBODIMENTS

Figure 1:
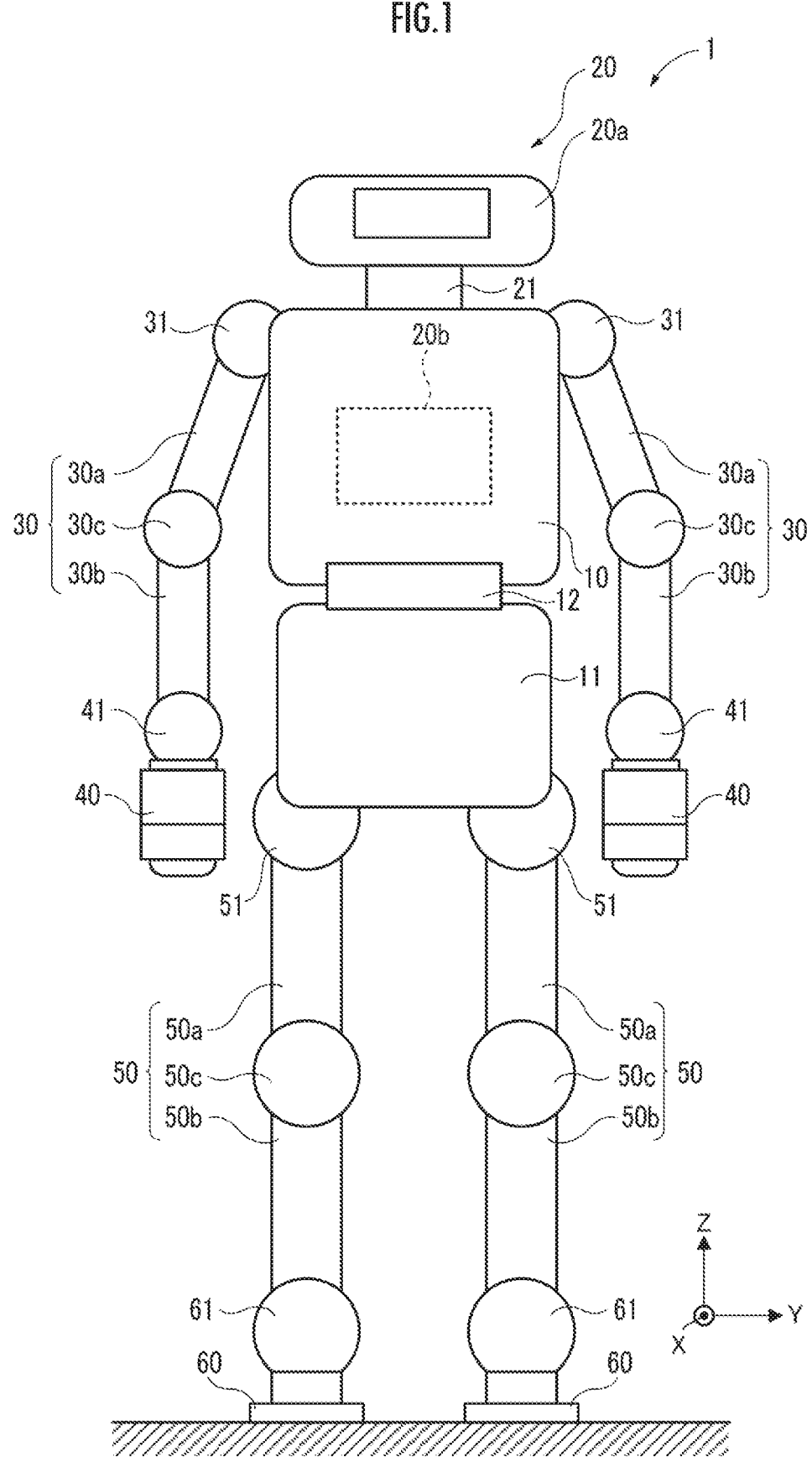
FIG. 1 is a front view schematically illustrating a configuration of a robot according to an embodiment.

Hereinafter, a robot according to an embodiment will be described with reference to the drawings. A robot 1 of the present embodiment is a humanoid robot, and is configured to be movable by switching between a bipedal walking mode and a quadrupedal walking mode.

Note that an end effector (a hand device) in the present invention is not applicable to the humanoid robot configured like this only. Consequently, the robot of the present invention also includes robots of different modes from the robot 1 of the present embodiment, as long as the robots comprise robot arms having end effectors (hand devices), such as other industrial robots.

First, a configuration of the robot 1 will be described with reference to FIG. 1.

A trunk of the robot 1 is composed of an upper base body 10, a lower base body 11 disposed under the upper base body 10, and a waist joint mechanism 12 provided between the upper base body 10 and the lower base body 11. The upper base body 10 and the lower base body 11 are connected relatively rotatably via the waist joint mechanism 12 corresponding to a human waist joint.

A head section of the robot 1 is an environment recognition unit 20a (a base body side recognition device) of an environment recognition device 20 for recognizing a surrounding environment. A camera for imaging an external environment, which is loaded on the environment recognition unit 20a, and a sensor for recognizing a distance to the external environment are controlled by an environment recognition unit control circuit 20b disposed inside the upper base body 10. The environment recognition unit 20a is connected rotatably to the upper base body 10 via a neck joint mechanism 21 corresponding to a human neck joint.

Since the robot 1 is a humanoid robot, the environment recognition unit 20a (the base body side recognition device) corresponding to a human head part is provided on an upper part of the upper base body 10. However, the base body side recognition device of the robot of the present invention is not limited to the configuration like this, but may be provided at a position other than the upper part of the upper base body 10 (for example, forward of the upper base body, the lower base body and the like) in accordance with use environment of the robot or the like.

A left and right arm bodies of the robot 1 are a pair of arm links 30 (movable links) provided to extend from both left and right sides of the upper part of the upper base body 10. The respective arm links 30 are connected rotatably to the upper base body 10 via shoulder joint mechanisms 31 corresponding to human shoulder joints.

The arm link 30 is composed of a first arm link section 30a corresponding to a human upper arm, a second arm link section 30b corresponding to a human forearm, and an elbow joint mechanism 30c corresponding to a human elbow joint.

The first arm link section 30a is connected rotatably to the upper base body 10 via the shoulder joint mechanism 31. The second arm link section 30b is connected rotatably to the first arm link section 30a via the elbow joint mechanism 30c. A hand section 40 (an end effector, a hand device) corresponding to a human hand is connected to a tip end of the second arm link section 30b.

In the robot 1, the arm link 30 as an arm body is composed of the first arm link section 30a, the second arm link section 30b and the elbow joint mechanism 30c. However, the arm body of the robot of the present invention is not limited to the configuration like this, but may have a single link section, or may have three or more link sections and a plurality of joint sections that connect the respective link sections.

The hand section 40 is an example of the end effector. The hand section 40 is connected rotatably to the second arm link section 30b of the arm link 30 via a wrist joint mechanism 41 corresponding to a human wrist joint. In the robot 1, a robot arm as a manipulator is composed of the hand section 40 and the arm link 30.

A left and right leg bodies of the robot 1 are a pair of leg links 50 (movable links) at a left and a right that are provided to extend downward from a lower part of the lower base body 11. The respective leg links 50 are connected rotatably to the lower base body 11 via hip joint mechanisms 51 corresponding to human hip joints.

The leg link 50 is composed of a first leg link section 50a corresponding to a human thigh, a second leg link section 50b corresponding to a human lower leg, and a knee joint mechanism 50c corresponding to a human knee joint.

The first leg link section 50a is connected rotatably to the lower base body 11 via the hip joint mechanism 51. The second leg link section 50b is connected rotatably to the first leg link section 50a via the knee joint mechanism 50c. A foot sole section 60 corresponding to a human foot is connected to a tip end of the second leg link section 50b.

In the robot 1, the leg link 50 which is a leg body is composed of the first leg link section 50a, the second leg link section 50b and the knee joint mechanism 50c. However, the leg body of the robot of the present invention is not limited to the configuration like this, but may have a single link section, or may have three or more link sections and a plurality of joint sections that connect the respective link sections.

The foot sole section 60 is connected rotatably to the second leg link section 50b of the leg link 50 via an ankle joint mechanism 61 corresponding to a human ankle joint.

Degrees of freedom of the joint mechanisms of the robot 1 will be described next with reference to FIG. 2.

In the present embodiment, directions in which the respective joint mechanisms rotate the respective members will be described with a posture in which the mechanisms do not rotate the connected members as a reference (hereinafter, referred to as "a reference posture") unless particular explanation is given. In the case of the robot 1, the reference posture is a state where the robot 1 stands up (a state in which the upper base body 10, the lower base body 11, the respective arm links 30 and the respective leg links 50 are straightened in a substantially vertical direction).

Figure 2:
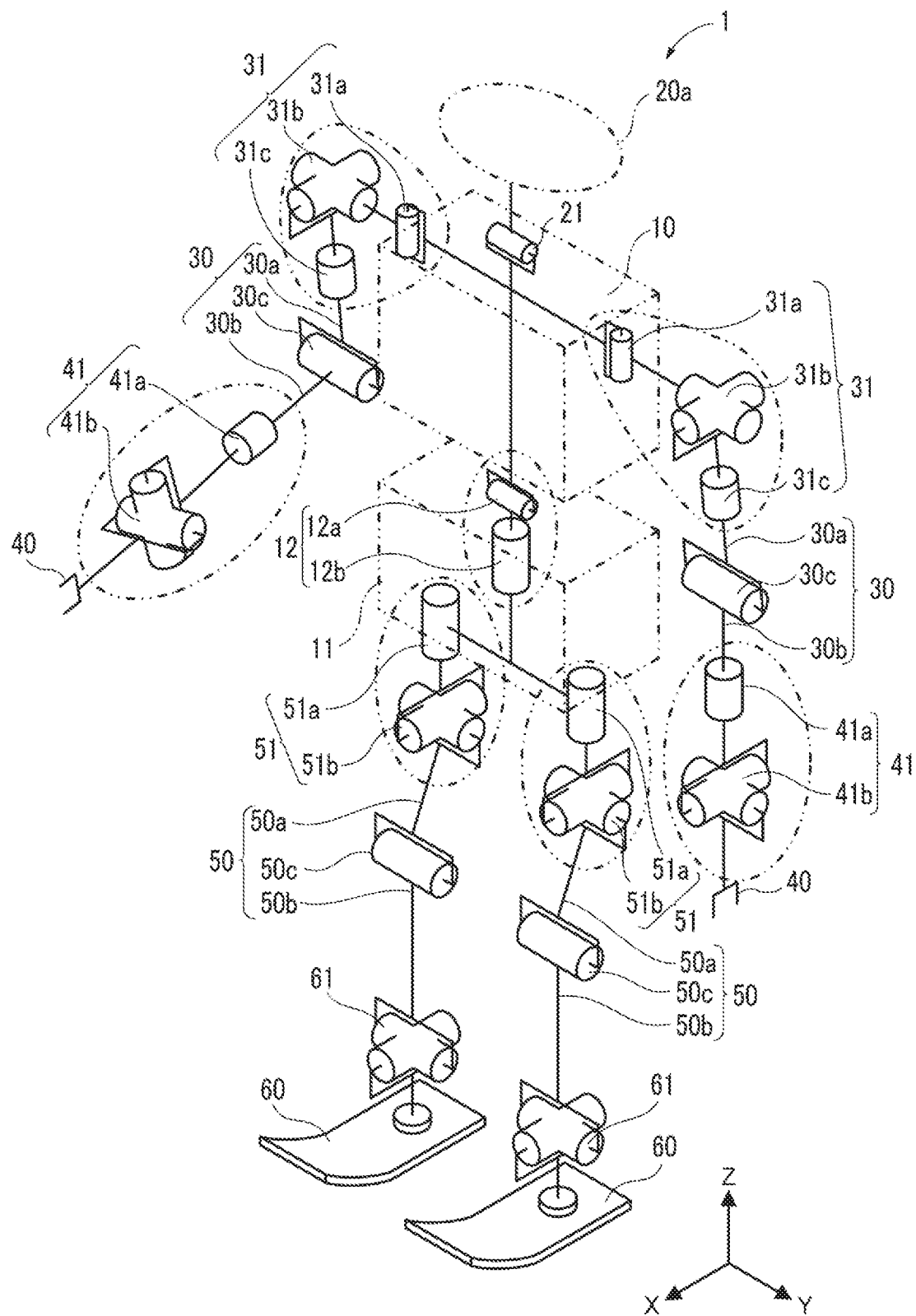
FIG. 2 is a perspective view schematically illustrating a degree of freedom of a joint mechanism of the robot in FIG. 1.

Further, in the present embodiment, a yaw axis, a pitch axis and roll axis respectively mean an axis in the vertical direction (Z-axis), an axis in a lateral direction (Y-axis) and an axis in an anteroposterior direction (X-axis) of the robot 1 at a time of the robot 1 being in the reference posture as illustrated in FIG. 2. In this case, the yaw axis is a truncal center axis of the upper base body 10 and the lower base body 11.

The waist joint mechanism 12 is composed of a first waist joint mechanism 12a disposed under the upper base body 10, and a second waist joint mechanism 12b disposed between the first waist joint mechanism 12a and the lower base body 11.

The first waist joint mechanism 12a connects the upper base body 10 to the lower base body 11 and the second waist joint mechanism 12b rotatably around the pitch axis. The second waist joint mechanism 12b connects the upper base body 10 and the first waist joint mechanism 12a to the lower base body 11 rotatably around the yaw axis.

The neck joint mechanism 21 connects the environment recognition unit 20a to the upper base body 10 rotatably around the pitch axis.

The elbow joint mechanism 30c of the arm link 30 connects the second arm link section 30b corresponding to a human forearm to the first arm link section 30a corresponding to a human upper arm rotatably around the pick axis.

The shoulder joint mechanism 31 is composed of a first shoulder joint mechanism 31a disposed to be located within a range of a width in the vertical direction and a width in a horizontal direction of the upper base body 10, a second shoulder joint mechanism 31b disposed sideway of the first shoulder joint mechanism 31a and outside of the upper base body 10, and a third shoulder joint mechanism 31c disposed between the second shoulder joint mechanism 31b and the first arm link section 30a of the arm link 30.

The first shoulder joint mechanism 31a connects the second shoulder joint mechanism 31b to the upper base body 10 rotatably around the yaw axis. The second shoulder joint mechanism 31b connects the third shoulder joint mechanism 31c to the first shoulder joint mechanism 31a rotatably around the pitch axis and around the roll axis. The third shoulder joint mechanism 31c connects the arm link 30 to the second shoulder joint mechanism 31b rotatably around the yaw axis.

The wrist joint mechanism 41 is composed of a first wrist joint mechanism 41a disposed at a hand section 40 side, of the second arm link section 30b of the arm link 30, and a second wrist joint mechanism 41b disposed between the first wrist joint mechanism 41a and the hand section 40.

The first wrist joint mechanism 41a connects the second wrist joint mechanism 41b to the second arm link section 30b rotatably around the yaw axis. The second wrist joint mechanism 41b connects the hand section 40 to the first wrist joint mechanism 41a rotatably around the roll axis and around the pitch axis.

The knee joint mechanism 50c of the leg link 50 connects the second leg link section 50b corresponding to a human lower leg to the first leg link section 50a corresponding to a human thigh rotatably around the pitch axis.

The hip joint mechanism 51 is composed of a first hip joint mechanism 51a disposed under the lower base body 11 and a second hip joint mechanism 51b disposed at a leg link 50 side of the first hip joint mechanism 51a.

The first hip joint mechanism 51a connects the second hip joint mechanism 51b to the lower base body 11 rotatably around the yaw axis. The second hip joint mechanism 51b connects the leg link 50 to the first hip joint mechanism 51a rotatably around the pitch axis and around the roll axis.

The ankle joint mechanism 61 connects the foot sole section 60 to the second leg link section 50b rotatably around the pitch axis and around the roll axis.

The configurations of the waist joint mechanism, the neck joint mechanism, the shoulder joint mechanisms, the elbow joint mechanisms, the knee joint mechanisms, the hip joint mechanisms, and the ankle joint mechanisms are not limited to the above described configurations, but may be properly changed in accordance with the applications of the robot, spaces for disposing the joints in the robot and the like. For example, any of the joint mechanisms may be omitted, or joint mechanisms other than those described above may be added.

Figure 3:
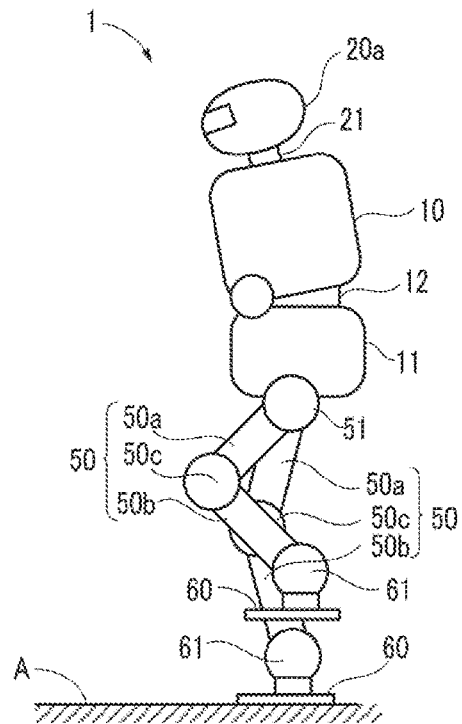
FIG. 3 is a side view illustrating a state of the robot in FIG. 1 moving in a bipedal walking mode.

Next, with reference to FIG. 3 and FIG. 4, two walking modes of the robot 1 will be described. In FIG. 3, in order to facilitate understanding, the arm links 30 are not illustrated.

In the present embodiment, "ground" the hand section 40 or the foot sole section 60 means bringing the hand section 40 or the foot sole section 60 into contact with an external environment so that the hand section 40 or the foot sole section 60 receives a contact reaction force against a force acting on the robot 1.

As illustrated in FIG. 3, in a bipedal walking mode, bringing the foot sole section 60 at a tip end of one of a pair of leg links 50 into a state grounded on a ground plane A (a state where the one leg link 50 is made a support leg), moving the foot sole section 60 at the tip end of the other leg link 50 in the air, and further grounding the foot sole section 60 at the tip end of the other led link 50 (causing the other leg link 50 to act as a lifted leg) are repeated. In this case, the motions as the lifted legs of the respective leg links 50 are alternately performed. Further, the arm links 30 not illustrated are in a non-grounded state.

Figure 4:
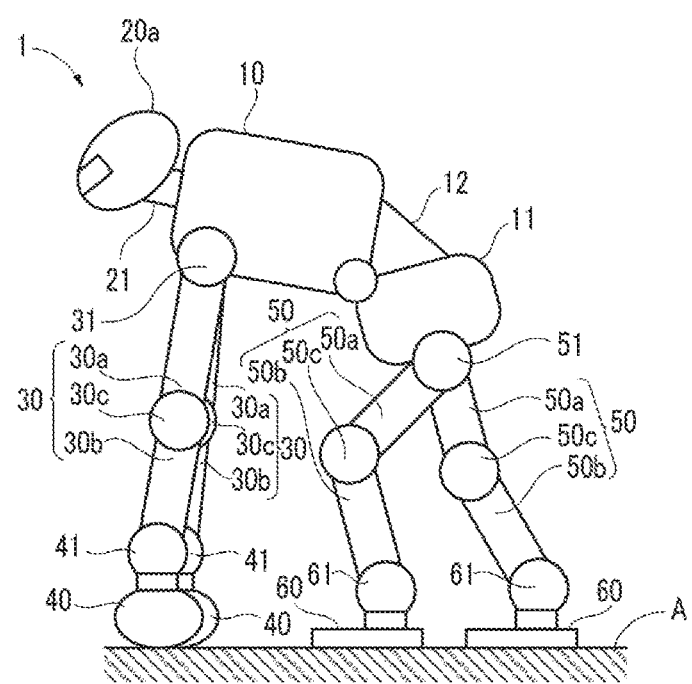
FIG. 4 is a side view illustrating a state of the robot in FIG. 1 moving in a quadrupedal walking mode.

As illustrated in FIG. 4, in a quadrupedal walking mode, bringing two or three of the hand sections 40 at the tip ends of the arm links 30 and the foot sole sections 60 at the tip ends of the leg links 50 into a state grounded on the ground plane A (a state where two or three of the arm links 30 and the leg links 50 are made support legs), moving the remaining two or one of the hand sections 40 or the foot sole sections 60 in the air, and further grounding the remaining two or one (causing the remaining two or one of the arm links 30 or the leg links 50 to act as lifted legs) are repeated. In this case, the arm link 30 or the leg link 50 that is caused to act as the lifted leg is periodically switched in accordance with a predetermined rule.

However, the motion of the quadrupedal walking mode is not limited to the above described motion. For example, it is possible to repeat bringing one of the hand sections 40 at the tip ends of the arm links 30 and the foot sole sections 60 at the tip ends of the leg links 50 into a state grounded on the ground plane A (a state where the one hand section 40 or foot sole section 60 is made a support leg), moving the remaining three of the hand sections 40 and the foot sole sections 60 in the air, and further grounding the remaining three (causing the remaining three of the hand sections 40 and the foot sole sections 60 to act as lifted legs).

Further, it is also possible to repeat moving the hand sections 40 at the tip ends of the arm links 30 and the foot sole sections 60 at the tip ends of the leg links 50 in the air at the same time (that is, causing the robot 1 to jump), and further grounding the hand sections 40 and the foot sole sections 60.

Hereinafter, with reference to FIG. 5A to FIG. 7, the hand section 40 will be described in detail. The hand section 40 in FIGS. 5A and 5B and FIGS. 6A and 6B is located at a right side of the robot 1 at the time of the reference posture, and configures a right hand.

Figure 5A:
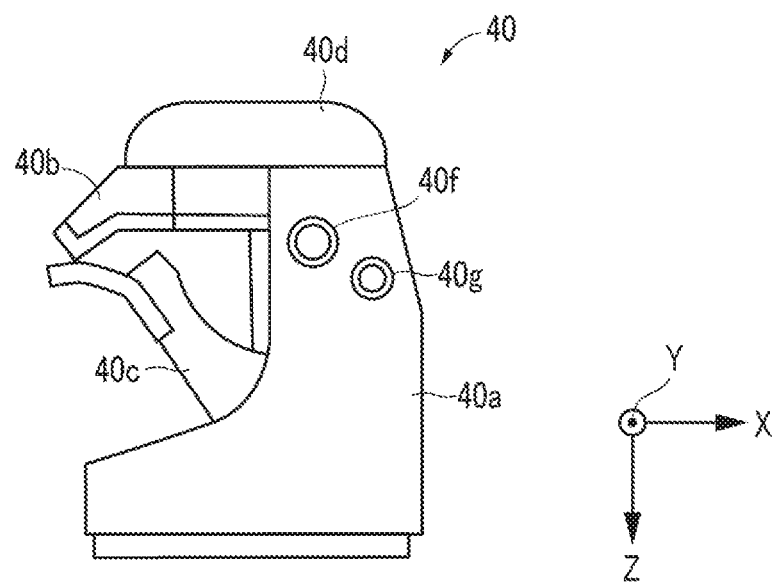
FIGS. 5A and 5B are schematic views illustrating part of a hand section of the robot in FIG. 1.
Figure 5B:
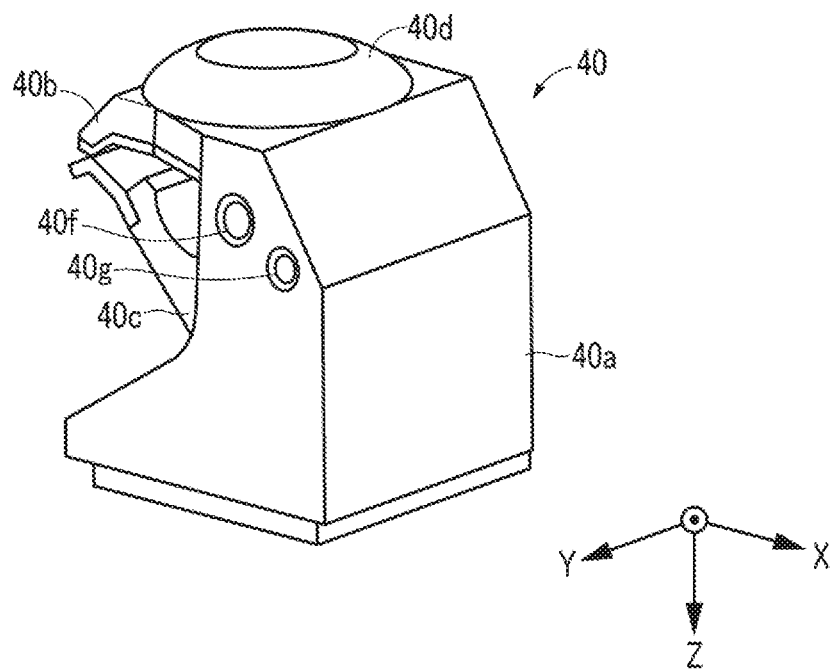

First, referring to FIGS. 5A and 5B, a configuration of the hand section 40 will be described in detail.

The hand section 40 comprises a hand base section 40*a* (a base section) corresponding to a palm and a back of a human hand, a first finger section 40*b* (a motion section, a motion link member) that is a single member corresponding to a forefinger, a middle finger, a third finger and a little finger of a human being, and a second finger section 40*c* corresponding to a human thumb.

The first finger section 40*b* is provided to extend in a direction (A direction other than the same direction or an opposite direction. A left side in the X-direction in FIG. 5A) non-parallel with a direction (the Z-direction in FIG. 5A (a longitudinal direction of the hand base section 40*a*)) toward a tip end portion from a base end portion of the hand base section 40*a*, from the tip end portion of the hand base section 40*a*. The first finger section 40*b* is constructed integrally with the hand base section 40*a* and is fixed to the hand base section 40*a*. A cushioning member 40*d* is attached to a surface at an opposite side from the hand base section 40*a*, of the first finger section 40*b*.

In the hand section 40 comprising the first finger section 40*b* constructed like this, at a time of a pushing motion, the first finger section 40*b* applies a load to an object via the surface (that is, the cushioning member 40*d*) at the opposite side from the hand base section 40*a*. At a time of a pulling motion, the first finger section 40*b* applies a load to the object via a surface at the hand base section 40*a* side, of the first finger section 40*b*.

In the conventional robot, the hand device is such that the hand base section and the first finger section are connected via the joint mechanism, and therefore the strength of the joint portion is not so high. Consequently, when a large load is applied to an object at the time of a pushing motion or a pulling motion (that is, a large force is applied to the first finger section), there is a fear that breakage occurs to the joint mechanism.

In contrast with this, in the robot 1 of the present embodiment, the hand section 40 is such that the first finger section 40*b* is fixed to the hand base section 40*a* (that is, the first finger section is not connected via a joint mechanism as in the conventional hand device of a robot), and therefore strength as a whole is increased as compared with the conventional hand device.

Consequently, even when a large load is applied to the object at the time of a pushing motion or a pulling motion (that is, even when a large force is applied to the first finger section 40*b*) in the hand section 40, breakage hardly occurs between the hand base section 40*a* and the first finger section 40*b*. Further, at the time of a pushing motion, the cushioning member 40*d* protects the first finger section 40*b*, so that breakage hardly occurs to the first finger section 40*b* itself.

Further, since the hand section 40 has sufficiently high strength, breakage does not occur even when the hand section 40 holds an object in such a manner as to support a self weight of the robot 1. Consequently, movement like climbing a ladder can be also performed by the motion of the hand sections 40 and rotation of the arm links 30. Further, the robot 1 can move with the first finger section 40*b* of the hand section 40 (in the present embodiment, the cushioning member 40*d* attached to the first finger section 40*b*) grounded.

Figure 6A:
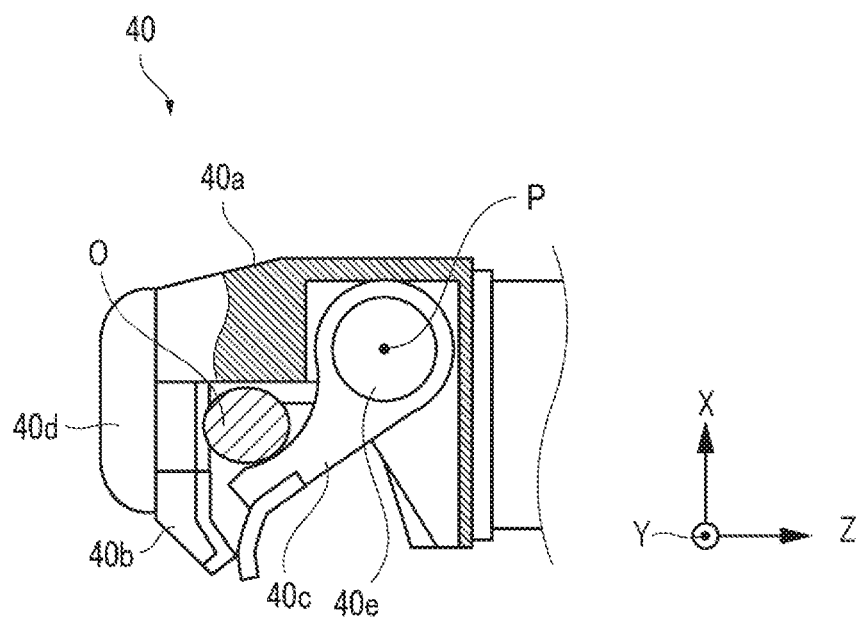
FIGS. 6A and 6B are side views illustrating the hand section and part of an arm link of the robot in FIG. 1 as sections.
Figure 6B:
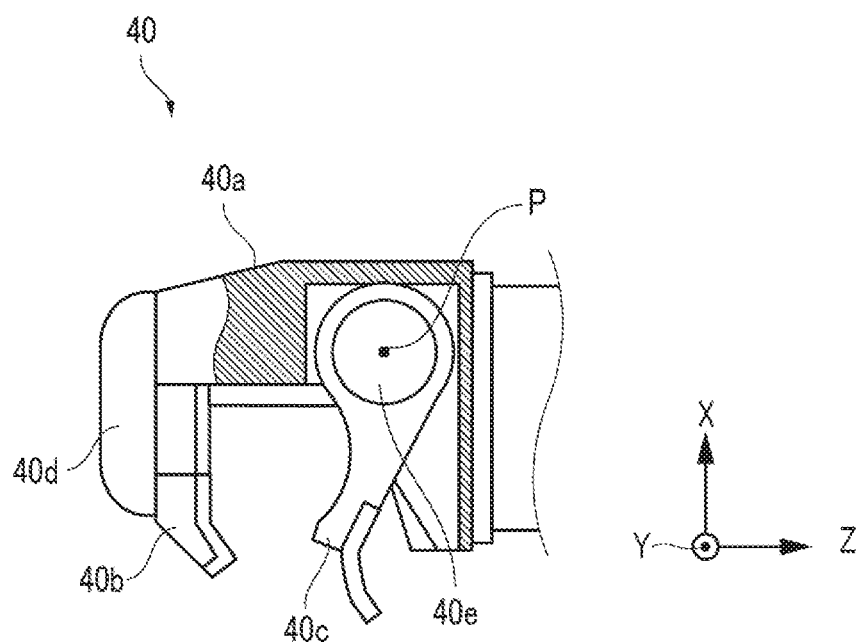

As illustrated in FIGS. 6A and 6B, the second finger section 40*c* is attached to the hand base section 40*a* in such a manner as to face a surface at a hand base section 40*a* side, of a tip end portion of the first finger section 40*b*. The second finger section 40*c* is rotated so that a tip end portion of the second finger section 40*c* approaches or separates from the first finger section 40*b* by a drive mechanism 40*e* provided inside the hand base section 40*a*.

The second finger section 40*c* is constructed in this way, so that even if the first finger section 40*b* is fixed, the hand section 40 can easily perform a motion of picking up an object O by the first finger section 40*b* and the second finger section 40*c*.

Further, the hand section 40 comprises a camera 40*f* (an end effector side recognition device, a hand side recognition device) contained in the hand base section 40*a*, and a floodlight projector 40*g* that illuminates a photographing range of the camera 40*f*. The camera 40*f* and the floodlight projector 40*g* are disposed on a side surface (a surface on a side in the Y-axis direction) so as to be able to photograph and illuminate a direction (the Y-axis direction) that is non-parallel with a (the Z-axis direction) in which the hand base section 40*a* is provided to extend, and a direction (the X-axis direction) in which the first finger section 40*b* is provided to extend.

That is, the camera 40*f* faces the direction (The Y-axis direction. That is, the direction (a second direction) which is non-parallel with the direction (a first direction) of the load that is applied to the object O by the first finger section 40*b*) which is non-parallel with the direction (the X-axis direction) of the pushing motion by the tip end portion of the first finger section 40*b* which is the motion link member, and the direction (the Z-axis direction) of the pushing motion by the surface on the opposite side from the hand base section 40*a*, of the first finger section 40*b*, and is provided to be able to recognize the Y-axis direction.

Thereby, when a motion of locking and pulling the object O by the first finger section 40*b*, a motion of pushing the object O by the first finger section 40*b*, a motion of pushing a switch or the like with the tip end portion of the first finger section 40*b* or the like is performed, a field of view (a recognition range) of the camera 40*f* and illuminating light of the floodlight projector 40*g* are not shielded by the object O in any stage of the motion.

Figure 7:
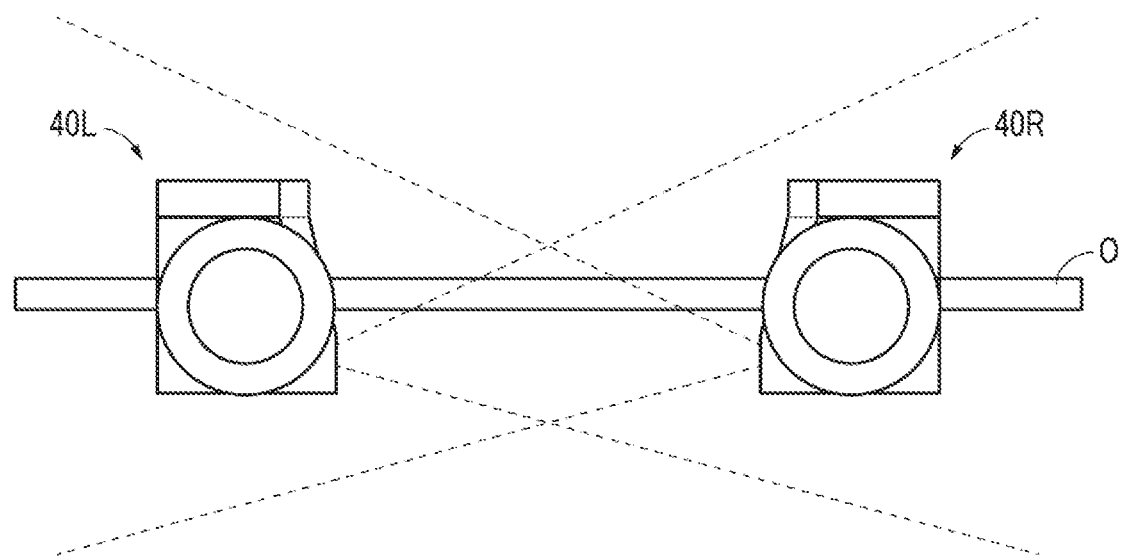
FIG. 7 is a front view illustrating a case where an object is grasped with the hand sections of the robot in FIG. 1.

Specifically, as illustrated in FIG. 7, for example, when a ladder (the object O) is gripped with a left and right hand sections 40R and 40L, the field of view (a region illustrated by broken lines) of the camera 40*f* is not shielded by the ladder which is the object O, at a stage before gripping the ladder, at a stage just before gripping the ladder, or at a stage when gripping the ladder.

Consequently, according to the hand section 40, even at the stage when the motion is completed and the stage just before the completion, the field of view of the camera 40*f* and the illuminating light of the floodlight projector 40*g* are not shielded by the object O, so that the situation around the hand section 40 can be properly recognized.

Further, in the hand section 40, the camera 40*f* and the floodlight projector 40*g* are contained in the hand base section 40*a*. Consequently, even when projections and depressions are present on a surface of the object of a motion (in particular, a pushing motion), the camera 40*f* and the floodlight projector 40*g* do not collide with the projected portions on the object.

The camera of the present invention (the end effector side recognition device, the hand side recognition device (hereinafter, simply referred to as "a recognition device" when these devices are collectively referred to)) can be a camera capable of recognizing the direction which is non-parallel with the direction of the motion which is performed to the object by the end effector (hand device). Therefore, the recognition direction does not always have to intersect the direction in which the first finger section 40b is provided to extend. Further, the recognition device does not have to be necessarily contained in the base section. For example, in a case where the object of a motion is limited to an object with a flat surface or the like, the recognition device may be externally attached to the hand base section.

Further, in the robot 1, as the hand side recognition device of the hand section 40, the camera 40f (that is, a device that performs optical photographing) is adopted. However, the recognition device of the present invention is not limited to the device that performs optical photographing such as a camera, but can be a device that can recognize the situation around the hand device, which is a recognition target.

For example, as the recognition device, a device that measures a time until an emitted laser light returns after the laser light is reflected by the external environment, and measures a distance to the external environment based on the time, like an LRF (a laser range finder), may be adopted. When an LRF or the like is adopted, the floodlight projector 40g for illuminating the photographing target may be omitted.

Next, with reference to FIGS. 6A and 6B, rotation of the second finger section 40c of the hand section 40 will be described.

The drive mechanism 40e rotates the second finger section 40c around a support point P that is located inside the hand base section 40a so as to cause the tip end portion of the second finger section 40c to approach or separate from the first finger section 40b.

The second finger section 40c rotates in this way, so that as illustrated in FIG. 6A, in a state where the tip end portion of the second finger section 40c is caused to approach the first finger section 40b (hereinafter, referred to as "a closed state"), the hand section 40 can grasp the object O by three-point contact with the surface at the hand base section 40a side, of the first finger section 40b, the surface at the hand base section 40a side, of the second finger section 40c, and a surface at a side where the first finger section 40b extends, of the hand base section 40a.

Further, in the closed state, the tip end portion of the second finger section 40c is located at a position nearer to the hand base section 40a than the tip end portion of the first finger section 40b, so that in the closed state, the entire hand section 40 is made compactor. Consequently, at the time of performing an operation in a narrow place, the hand section 40 which is the end effector can be easily moved to an operation region by bringing the hand section 40 into the closed state. As a result, contact of the hand section 40 with the external environment is prevented, and breakage of the hand section 40 can be prevented.

As illustrated in FIG. 6B, in a state where the tip end portion of the second finger section 40c is separated from the tip end portion of the first finger section 40b (hereinafter, referred to as "an open state"), the second finger section 40c is located at a position where the second finger section 40c is protruded from the first finger section 40b, so that the hand section 40 can perform a motion of pushing a button or the like with the tip end portion of the second finger section 40c.

Next, with reference to FIGS. 1, 4 and 5A and 5B, photographing ranges of the camera 40f at respective motion times will be described.

As illustrated in FIG. 1, the robot 1 comprises the upper base body 10, and a pair of arm links 30 which are connected to the upper base body 10.

The arm link 30 is composed of the first arm link section 30a, the second arm link section 30b, and the elbow joint mechanism 30c which connects the first arm link section 30a and the second arm link section 30b in series and rotatably, and the hand section 40 is attached to the tip end portion of the second arm link section 30b. That is, the robot arm as a manipulator is composed of the arm link 30 and the hand section 40.

Here, in the present embodiment, a state where the elbow joint mechanism 30c of the arm link 30 is not rotated is set as the reference state of the robot arm. In the reference state, the robot arm is in a most straightened state.

In the robot 1 comprising the robot arms as above, the camera 40f in the hand section 40 of one robot arm (a first robot arm) is capable of photographing the hand section 40 of the other robot arm (a second robot arm) when both the left and right robot arms are in the reference state.

Specifically, as illustrated in FIG. 4, at a time of the posture in which the left and right robot arms are both straightened downward of the upper base body 10 to ground the hand sections 40, the camera 40f of one of the left and right hand sections 40 is capable of photographing the other hand section 40 and a situation around the other hand section 40.

In this way, in the robot 1, the hand section 40 of the one robot arm which is in the reference state (that is, the state in which the robot arm is straightened to a maximum extent) can be recognized by the camera 40f of the other robot arm which is in the reference state (that is, the state where a bending motion is not performed).

That is, in the robot 1, the camera 40f of the other robot arm can be turned to the one robot arm in the state straightened to the maximum extent without performing a bending motion of the other robot arm, unlike the configuration in which the recognition device is provided in the palm portion of the hand of the hand device as in the conventional robot. That is, the hand device of the one robot arm can be located in the photographing range of the camera of the other robot arm in the state where both the robot arms are straightened to the maximum extent.

Thereby, in the robot 1, the camera 40f which is provided in the hand section 40 which performs photographing can be brought closer to the hand section 40 of the photographing target than the conventional robot because a bending motion does not have to be performed, so that detailed photographing can be performed with respect to the hand section 40 and the surrounding situation. Further, the bending motion of the robot arm comprising the hand section 40 that performs photographing is not required, so that a space for the bending motion can be saved.

Further, as illustrated in FIG. 1, the robot 1 comprises the environment recognition unit 20a (the base body side recognition device) as the head section of the robot 1, above the upper base body 10.

The recognition direction of the environment recognition unit 20a is in the direction non-parallel with the photographing range of the camera 40f when the robot arm composed of the arm link 30 and the hand section 40 are in the reference state (that is, even when the robot arm is straightened to the maximum extent and the hand section 40 of the robot arm is in the farthest position).

Specifically, as illustrated in FIG. 4, at the time of the posture in which the left and right robot arms are both straightened downward of the upper base body 10 to ground the hand sections 40, the environment recognition unit 20a recognizes the ground plane A from above, and the cameras 40f of the hand sections 40 recognize the direction substantially parallel with the ground plane A.

Further, the camera 40f of the hand section 40 can continue to photograph the situation of the object (for example, the ground plane A on which the hand section 40 is grounded (to which the pushing motion is performed by the hand section 40)), regardless of the stage of the motion.

Consequently, the robot 1 can continue to always recognize the object from multiple angles with the environment recognition unit 20a and the camera 40f, regardless of the state of the robot arm and the stage of the motion.

Further, when the robot 1 is in the quadrupedal walking mode, the photographing range of the camera 40f is a position near to the contact plane A, and a direction of the photographing range is substantially parallel with the ground plane A, so that the situation of the ground plane A can be photographed in derail by the camera 40f. As a result, at the time of the quadrupedal walking mode, the robot 1 can be caused to walk stably based on the situation photographed by the camera 40f.

While the illustrated embodiment is described thus far, the present invention is not limited to the mode like this.

For example, in the above described embodiment, the hand section 40 (that is, the hand device) is the end effector. However, the end effector in the present invention is not limited to the one used as the hand device.

For example, as the motion section, a motion link member that is movable with respect to the base section may be adopted, instead of the motion link member constructed integrally with the base section, like the first finger section 40b. For example, the end effector comprising a number of motion link members like the end effector described in Japanese Patent No. 5515654 may be adopted.

Further, in the above described embodiment, the recognition range (the second direction) of the camera 40f that is the hand side recognition device is specified with the motion direction (the first direction) of the first finger section 40b provided in the hand section 40 as the reference. However, the recognition range (the second direction) in the present invention is not limited to the direction with the first finger section 40b as the reference, but can be specified based on the direction (the first direction) of the load which the motion section of the end effector applies to the object.

For example, in the case of an end effector (an end effector that can perform only a pressing motion by the base section) that performs the motion by using a part of the base section as the motion section to press the part against the object without including the motion link member, the recognition direction (the second direction) of the recognition device can be specified with the direction of the pressing motion set as the first direction.

Further, in the above described embodiment, the configuration in which the hand sections 40 comprising the cameras 40f are adopted in the humanoid robot 1 comprising a pair of left and right arm links 30 (the robot arms) and leg links 50 is described.

However, the robot of the present invention is not limited to the configuration like this, but can be a robot comprising a plurality of robot arms having end effectors equipped with recognition devices, or a robot comprising robot arms having end effectors equipped with recognition devices and a base body equipped with a base body side recognition device. Therefore, for example, the robot may comprise drive wheels or the like instead of the leg links.

Further, in the above described embodiment, the robot arm is composed of the arm link 30 and the hand section 40. Here, the arm link 30 is composed of the first arm link section 30a, the second arm link section 30b, and the elbow joint mechanism 30c which connects the first arm link section 30a and the second arm link section 30b in series and rotatably.

However, the robot arm of the present invention is not limited to the configuration like this, but can be the one comprising a plurality of link sections connected in series, the hand device attached to the link sections, and a joint mechanism rotatably connecting the link sections to each other. Therefore, the configuration comprising three or more link sections, for example, may be adopted.

REFERENCE SIGNS LIST

1 Robot
10 Upper base body
11 Lower base body
12 Waist joint mechanism
12a First waist joint mechanism
12b Second waist joint mechanism
20 Environment recognition device
20a Environment recognition unit (base body side recognition device)
20b Environment recognition unit control circuit
21 Neck joint mechanism
30 Arm link (movable link)
30a First arm link section
30b Second arm link section
30c Elbow joint mechanism
31 Shoulder joint mechanism
31a First shoulder joint mechanism
31b Second shoulder joint mechanism
31c Third shoulder joint mechanism
40, 40L, 40R Hand section (end effector, hand device)
40a Hand base section (base section)
40b First finger section (motion section, motion link member)
40c Second finger section
40d Cushioning member
40e Drive mechanism
40f Camera (end effector side recognition device, hand side recognition device)
40g Floodlight projector
41 Wrist joint mechanism
41a First wrist joint mechanism
41b Second wrist joint mechanism
41c Drive section
50 Leg link (movable link)
50a First leg link section
50b Second leg link section
50c Knee joint mechanism
51 Hip joint mechanism
51a First hip joint mechanism
51b Second hip joint mechanism
60 Foot sole section
61 Ankle joint mechanism
A Ground plane
O Object
P Support point of rotation of second finger section 40c

What is claimed is:

1. An end effector that is attached to a robot arm, comprising
a base section that is attached to the robot arm;
a motion section that is provided at the base section, the motion section extending in a direction intersecting with an extending direction of the base section; and
an end effector side recognition device that is installed in the base section,
wherein the end effector side recognition device is embedded in the base section so that a photographing direction of the end effector side recognition device faces a direction intersecting a plane including the extending direction of the base section and the extending direction of the motion section.

2. The end effector according to claim 1,
wherein the motion section is a motion link member that is attached movably to the base section.

* * * * *